(12) United States Patent
Desire et al.

(10) Patent No.: US 7,166,809 B2
(45) Date of Patent: Jan. 23, 2007

(54) LOCKDOWN DEVICE FOR IMMOBILIZING A LOADCELL DURING TRANSPORT

(75) Inventors: Régis Desire, Sceaux (FR); Olivier Galtier, Paris (FR)

(73) Assignee: Neopost Industrie, Bagneux (FR)

( * ) Notice: Subject to any disclaimer, the term of this patent is extended or adjusted under 35 U.S.C. 154(b) by 40 days.

(21) Appl. No.: 10/766,467

(22) Filed: Jan. 27, 2004

(65) Prior Publication Data

US 2004/0226759 A1  Nov. 18, 2004

(30) Foreign Application Priority Data

Jan. 29, 2003 (FR) .................................. 03 00969

(51) Int. Cl.
*G01G 23/02* (2006.01)

(52) U.S. Cl. ....................................................... 177/154

(58) Field of Classification Search ......... 177/154–159
See application file for complete search history.

(56) References Cited

U.S. PATENT DOCUMENTS

| 4,515,232 A | * | 5/1985 | Rubinstein .................. 177/154 |
| 5,319,161 A | * | 6/1994 | Miller et al. ................ 177/154 |
| 5,393,936 A | | 2/1995 | Tyhy et al. .................. 177/138 |
| 5,923,000 A | * | 7/1999 | Tschopp et al. ............. 177/154 |
| 6,331,682 B1 | | 12/2001 | Hopkins et al. ............. 177/154 |

FOREIGN PATENT DOCUMENTS

EP             0572181 A1 * 12/1993

\* cited by examiner

*Primary Examiner*—Randy W. Gibson
(74) *Attorney, Agent, or Firm*—Perman & Green, LLP

(57) ABSTRACT

This invention relates to a weighing module comprising a weighing cell incorporating strain gauges disposed between a lower platform connected to a body of the module and an upper platform connected to a weighing deck and immobilization means for immobilizing the weighing cell during transport of the module, these immobilization means comprising a first bracket fixed to the lower platform, a second bracket fixed to the upper platform and a single connection stud for fixedly connecting these two brackets.

6 Claims, 2 Drawing Sheets

LOCKDOWN DEVICE FOR IMMOBILIZING A LOADCELL DURING TRANSPORT

FIELD OF THE INVENTION

This application claims benefit of the earlier filed French Application No. 03 00969, filed Jan. 29, 2003.

The present invention relates to the specific domain of mail handling and more particularly to a dynamic weighing module of a mail handling machine interposed between a mail item feed module and a module for franking these items.

BACKGROUND OF THE INVENTION

Dynamic weighing modules intended to be used with franking machines are well known. French Patent Application No. 2 388 352 illustrates a particular example thereof. These devices are formed by a weighing deck and drive belts for automatically conveying the mail items from one side of this deck to the other. The weighing module may be used alone but it is usually interposed in a mail handling assembly between the exit of the feed module from which the closed envelopes having to be franked are ejected, and the entrance of the franking module.

Accompanying FIG. 4 illustrates the essential elements of such a weighing module. The weighing cell 10 used in this type of module is a conventional load sensor comprising flexible elements, strain gauges and the associated wirings and it is therefore unnecessary to describe it. Models PV2GC3 of the firm HBM or 1042 of the firm TEDEA are classic examples thereof. This cell is mounted between two platforms, a fixed lower platform 12 and a mobile upper platform 14, and is fixed thereto, via two shims 16, 18, by screws 20, 22 which traverse them. Two assemblies 24, 26 of vertical feet arranged at the four corners of these two platforms extend towards each other (the feet fast with the lower platform upwardly, and the feet fast with the upper platform downwardly) in order to define therebetween a free space G corresponding to the maximum load admissible by the cell.

During transport of a weighing module, it is usual to immobilize the weighing sensor by maintaining the two platforms by a relatively complex securing system while arranging shims between the vertical feet to remain in an acceptable zone of constraint of the sensor. Now, if the module remains a long time in this position before it is delivered to the client, the pre-stress exerted on the sensor most often necessitates a recalibration of the weighing cell after the platforms have been released. In addition, the securing of the platforms is generally effected vertically in the sense of weighing, this involving at least lifting the cover of the module, possibly dismantling certain parts, sometimes even turning the machine over to unscrew the screws ensuring this securing.

It is an object of the present invention to propose considerably simplifying this system of immobilizing the weighing cell during transport thereof with the aid of a simple, economic means without exerting pre-stress on the sensor, this allowing the weighing module to be instantaneously restarted. Another object of the invention is to ensure such immobilization with a minimum of operations in the factory and to allow the sensor to be released by the user without intervention inside the module.

SUMMARY OF THE INVENTION

These objects are attained by a weighing module comprising a weighing cell incorporating strain gauges disposed between a lower platform connected to a body of the module and an upper platform connected to a weighing deck and immobilization means for immobilizing the weighing cell during transport of the module, characterized in that said immobilization means comprise a first retaining means fixed to said lower platform, a second retaining means fixed to said upper platform and a single connection means for fixedly connecting said first retaining means to said second retaining means.

In this way, one sole manoeuvre of the connection means (advantageously accessible via the front of the module) makes it possible to lock or unlock the weighing cell.

These retaining means each comprise a piece forming bracket with a horizontal part and a vertical part, said vertical part comprising an orifice and each of said brackets is fixed by said horizontal part to one of said platforms by screws.

The single connection means, advantageously directly accessible by the user on a front face of the module, comprises a stud intended to be introduced in said orifices of said vertical parts of said brackets. It may comprise a threaded part intended to cooperate with one of said orifices and a smooth part intended to cooperate with the other of said orifices.

BRIEF DESCRIPTION OF THE DRAWINGS

The invention will be more readily understood on reading the following description given by way of non-limiting example with reference to the accompanying drawings, in which.

DESCRIPTION OF PREFERRED EMBODIMENT

Figure 1:
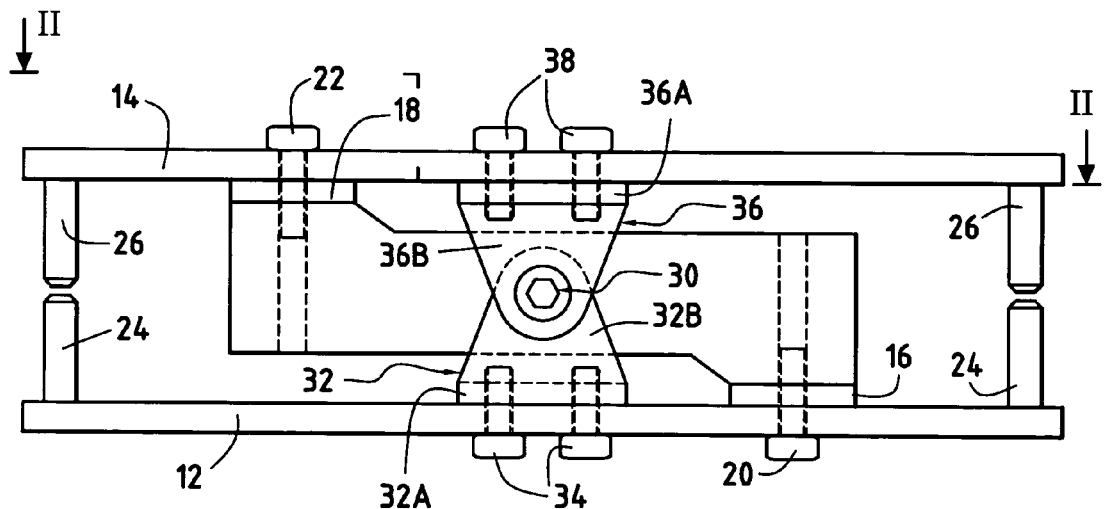
FIG. 1 shows a view in section of the principal constituents of a weighing module provided with means according to the invention for immobilizing the weighing cell.
Figure 2:
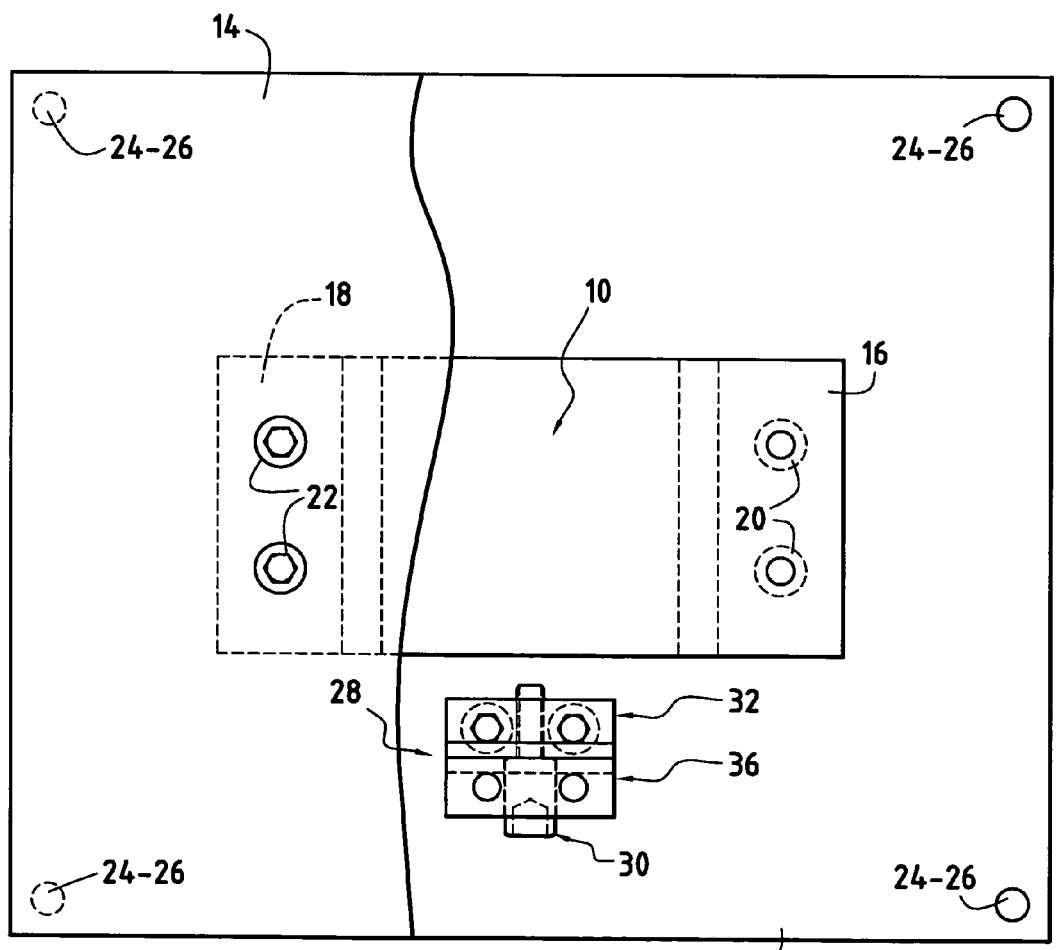
FIG. 2 is a plan view along plane II—II of FIG. 1.
Figure 3:
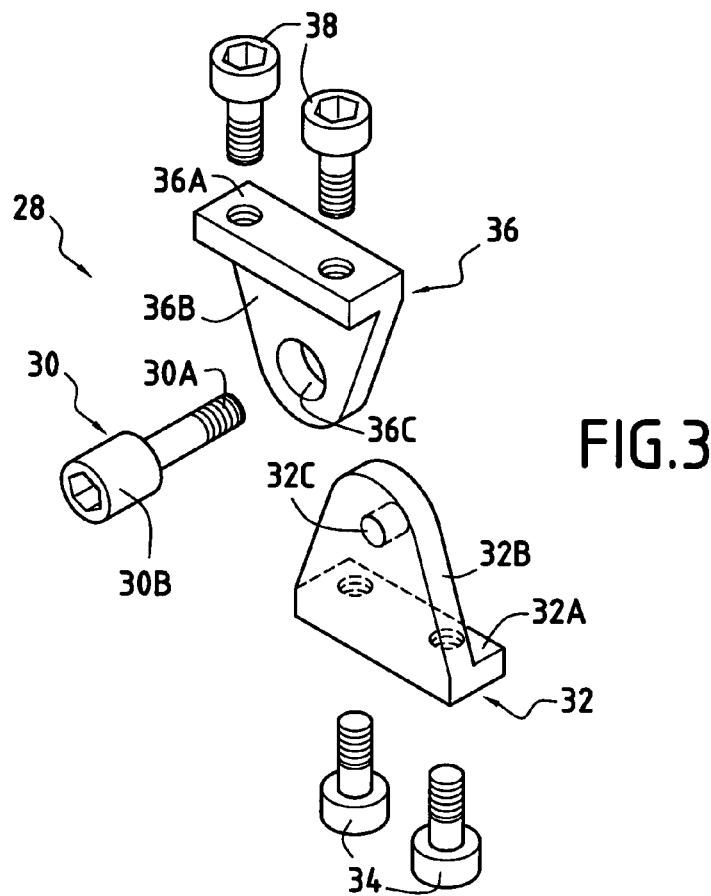
FIG. 3 shows a view in perspective of the means for immobilizing the weighing cell of FIG. 1, and FIG. 4 to which reference has already been made, illustrates a part of a weighing module of the prior art.
Figure 4:
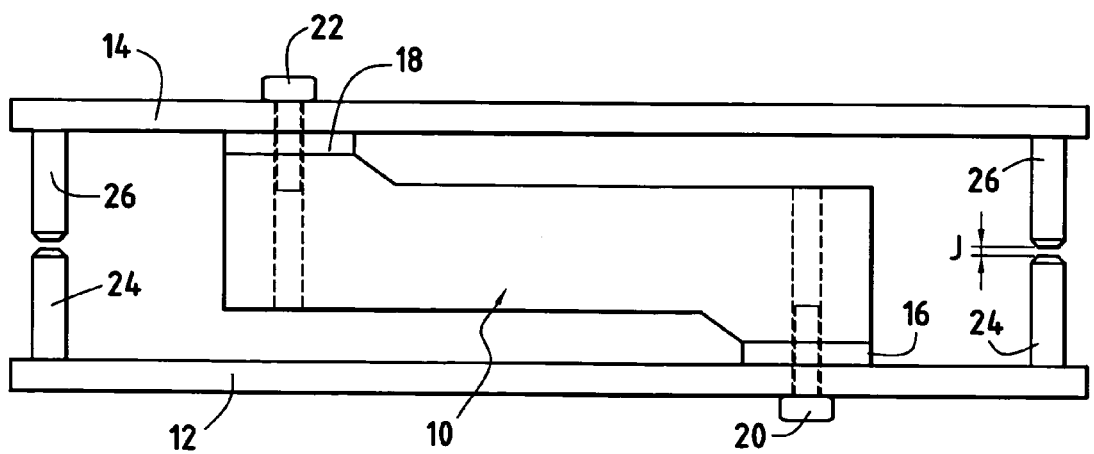

Referring again to the drawings, and now to FIGS. 1 to 3, a weighing module is organized around a weighing cell 10 mounted between two platforms, a fixed lower platform 12 connected to the body of the weighing module (not shown) and a mobile upper platform 14 connected to the weighing deck proper (not shown). This cell is fixed to these two platforms, via two shims 16, 18, by screws 20, 22 or any other means of fixation which pass through these three elements. Vertical feet disposed at the four corners of the two platforms extend towards one another (those, 24, of the lower platform upwardly towards the upper platform, the others, 26, of the upper platform downwardly towards the lower platform) to define therebetween a free space J corresponding to the maximum load admissible by the weighing cell.

According to the invention, in order to allow immobilization of the weighing cell 10 during transport, immobilization means 28 are provided, constituted by a single stud 30, a first plate 32 of sheet metal (or any other material of sufficient rigidity), advantageously in the form of an L to form a bracket, of which a horizontal part 32A is connected to the lower platform 12, advantageously by screws 34, and a second sheet metal plate of L shape, likewise forming bracket 36, of which a horizontal part 36A is connected to the upper platform 14, advantageously by screws 38. The vertical parts 32B, 36B of these two brackets are each pierced with an orifice 32C, 36C intended to come opposite one another and in which will be introduced in a direction perpendicular to the sense of weighing, the single stud 30 intended to connect together the two brackets and correlatively the two platforms to which they are each connected. Of course, the invention is not limited to the example illustrated and any connection means other than the single stud 30 ensuring removable connection (locking/unlocking) between the two platform retaining means constituted by the brackets 32 and 36, may also be envisaged.

This stud preferably comprises a threaded terminal part 30A in order to be screwed in one of the two plates whose orifice (for example 36C) is therefore tapped accordingly, the orifice of the other plate (32C in the example illustrated) being smooth in order to receive a guiding part 30B, likewise smooth, of the stud 30. This second orifice may comprise a bush (not shown) of width greater than that of the corresponding plate in order to allow a better guiding of the stud.

The immobilization means are positioned in the factory when the weighing cell is assembled in its module. Such positioning is effected very simply, for example as follows: Once the cell 10 is fixed between its two platforms 12, 14, the fixation of a first bracket, for example the first bracket 32, is firstly proceeded with, said bracket being screwed by means of screws 34 on the lower platform 12, then the second bracket 36 is in turn fixed on the upper platform 14 by screws 38. In both cases, tightening of the screws must be sufficient to ensure application of the brackets against the platforms, but not too great in order to allow a certain freedom of rotation of the brackets. In effect, once these two tightening operations have been carried out, the stud 30 must be able to be introduced in the orifices 32C, 36C of the two brackets which face each other but which may possibly be very slightly offset. When the stud is in position, the screws 34, 38 may then be definitively screwed, the brackets then taking their definitive positions, parallel to each other. The weighing cell is thus perfectly immobilized in a stress-free position. With the present invention, it is not necessary to arrange shims between the feet nor additional securing of the platforms in order to transport the weighing module from the factory where it was assembled to its place of use by the client.

Once on its site of use, starting of the weighing module is virtually instantaneous, without prior calibration, by simply removing the stud 30 from its location which, by releasing the two brackets, will release the two platforms 12, 14 and allow immediate use of the weighing cell 10. The front face of the weighing module will preferably comprise a direct access to this stud which the user can therefore remove with a simple screwdriver himself.

What is claimed is:

1. Weighing module comprising a weighing cell incorporating strain gauges disposed between a lower platform connected to a body of the module and an upper platform connected to a weighing deck and immobilization means for immobilizing the weighing cell during transport of the module, wherein, the immobilization means comprise a first retaining means fixed to the lower platform, a second retaining means fixed to the upper platform and a single removable connection means for fixedly connecting the first retaining means to the second retaining means.

2. The device of claim 1, wherein said retaining means each comprise a piece forming bracket with a horizontal part and a vertical part, said vertical part comprising an orifice.

3. The device of claim 2, wherein each of said brackets is fixed by said horizontal part to one of said platforms by screws.

4. The device of claim 1, wherein said single connection means comprises a stud intended to be introduced in said orifices of said vertical parts of said brackets.

5. The device of claim 4, wherein said stud comprises a threaded part intended to cooperate with one of said orifices and a smooth guiding part intended to cooperate with the other of said orifices.

6. The device of claim 1, wherein said single connection means is directly accessible by the user on a front face of the module.

* * * * *